United States Patent [19]

Rumpel et al.

[11] Patent Number: 5,192,100

[45] Date of Patent: Mar. 9, 1993

[54] INDEPENDENT SUSPENSION WITH DOUBLE ISOLATED SUSPENSION UNIT

[75] Inventors: Manfred Rumpel, Birmingham; Sino J. Van Dyk, Plymouth, both of Mich.

[73] Assignee: Ford Motor Company, Dearborn, Mich.

[21] Appl. No.: 634,253

[22] Filed: Dec. 26, 1990

[51] Int. Cl.⁵ .......................................... B60G 11/56
[52] U.S. Cl. .................................. 280/668; 280/673; 280/716; 280/96.1
[58] Field of Search ................. 280/96.1, 660, 666, 280/668, 673, 674, 716

[56] References Cited

U.S. PATENT DOCUMENTS

| | | | |
|---|---|---|---|
| 2,967,066 | 1/1961 | Mueller | 280/692 |
| 3,941,401 | 3/1976 | Allison | 280/673 |
| 4,105,222 | 8/1978 | Buchwald | 280/668 |
| 4,341,396 | 7/1982 | Decouzon et al. | 280/666 |
| 4,441,593 | 4/1984 | Axthammer | 188/322.11 |
| 4,756,517 | 7/1988 | Kakimoto | 267/220 |
| 4,877,262 | 10/1989 | Tanahashi et al. | 280/668 |

FOREIGN PATENT DOCUMENTS 1397965 6/1975 United Kingdom.
2039259 8/1980 United Kingdom.

Primary Examiner—Kenneth R. Rice
Attorney, Agent, or Firm—Raymond L. Coppiellie; Roger L. May

[57] ABSTRACT

An independent suspension for a vehicle comprises a chassis, an upwardly extending telescopic suspension unit and means connecting the upper end of the suspension unit to the chassis. The suspension further includes a wheel support member for rotatably mounting a roadwheel, the wheel support member including double isolation means for resiliently mounting the lower end of the suspension unit to the wheel support member.

17 Claims, 5 Drawing Sheets

INDEPENDENT SUSPENSION WITH DOUBLE ISOLATED SUSPENSION UNIT

BACKGROUND OF THE INVENTION

1. Field of the Invention

The present invention relates generally to independent suspensions for automotive vehicles. More particularly, the present invention relates to an independent suspension having a double isolated shock absorber strut assembly.

2. Disclosure Information

In a typical MacPherson or modified MacPherson suspension geometry, such as shown in FIG. 1, a wheel support member 10 rotatably supports the vehicle roadwheel 12. As used herein, "wheel support member" refers to either a knuckle/spindle assembly used to support the steerable wheels of a vehicle or to a spindle assembly supporting the nonsteered wheels of the vehicle. A shock absorber strut assembly 14 is connected to the vehicle body 15 via an elastic or resilient suspension support member 18. In the conventional suspension geometries, the wheel support member 10 is rigidly connected to the lower end of the shock absorber strut assembly 14 at a single location 16. In such a configuration, as the roadwheels travel over a nonsmooth surface, vibrations resulting from contact of the roadwheel with the road surface are transmitted directly from the spindle through the rigid connection with the shock absorber strut assembly to the vehicle body, resulting in undesirable vibration and noise experienced by the vehicle occupants.

Various attempts at isolating the noise and vibration of the roadwheel through the shock absorber have been proposed. Typically, most systems employing a shock absorber strut assembly utilize an elastomeric bushing or mount at the vehicle body to isolate the noise and vibration of the roadwheel. Examples of these solutions are shown in U.S. Pat. Nos. 2,967,066; 4,756,517; 4,877,262; 4,441,593; and Great Britain Patent Nos. 1,397,965; and 2,039,259. Although adequate for minimizing some of the road vibrations, the above embodiments do not completely remove the undesirable noise, vibration and harshness effects transmitted to the vehicle body. The above systems do not isolate the shock absorber strut unit from the wheel support member and, therefore, do not eliminate the roadwheel vibration from the suspension unit. Therefore, there is a need to isolate the shock absorber strut suspension unit from the wheel support member due to the roadwheel to minimize the amount of vibrations passing to the vehicle body.

U.S. Pat. Nos. 4,105,222 and 4,341,396 both disclose independent strut type suspension systems wherein the shock absorber strut assembly is rigidly secured at two locations to the vehicle spindle. The '222 patent does not teach or suggest the use of any resilient means to isolate the vibrations from the roadwheel to the strut assembly at the mounting locations on the vehicle strut, allowing road vibrations to pass through the spindle to the strut. In the '396 patent, the strut is connected to the axle rack by a pair of legs which are articulated to upper and lower extensions of the axle rack. The upper and lower leg extensions are rigidly connected to the strut housing and, therefore, do not isolate the strut from the road vibrations.

The present invention addresses the problem of vibrations passing from the roadwheels through the shock absorber strut assembly to the vehicle body and attempts to isolate the shock absorber strut from the vibrations through the use of a wheel support member having a pair of bushings which isolate the shock absorber from the vehicle spindle. It is an object of the present invention to provide a wheel support member assembly wherein a shock absorber strut assembly is secured resiliently at two locations within the knuckle to isolate the shock absorber strut assembly from the road vibrations.

It is a feature of the present invention that road vibrations of the vehicle roadwheels are not transmitted to the body of the vehicle through the use of a pair of resilient bushings circumferentially surrounding the shock absorber strut assembly.

It is a further feature of the present invention that the resilient bushings allow a limited amount of movement of the wheel support member relative to the shock absorber strut assembly in a direction generally parallel to longitudinal axis of the strut as well as for pivotal movement of the strut assembly around a longitudinal axis of the strut.

These and other objects, features and advantages of the present invention will become apparent from the summary, descriptions, drawings and claims which follow.

SUMMARY OF THE INVENTION

There is disclosed herein an independent suspension for both the steered and nonsteered roadwheels of a vehicle comprising a chassis, an upwardly extending telescoping suspension unit, and means connecting the upper end of the suspension unit to the chassis. The independent suspension further comprises a wheel support member for rotatably mounting a roadwheel, the wheel support member including double isolation means for resiliently mounting the suspension unit to the wheel support member.

In one embodiment, the double isolation means may comprise an upper isolation bushing circumferentially surrounding the suspension unit and disposed in an upper aperture of the wheel support member. The double isolation member may further include a lower isolation bushing circumferentially disposed around the suspension unit and resiliently mounting the lowermost end of the suspension unit to the wheel support member.

Furthermore, there is disclosed herein a wheel support member for rotatably mounting a roadwheel of a vehicle for use in an independent suspension of the type including a telescoping suspension unit attached at its upper end to the chassis of the vehicle, the wheel support member comprising an upper aperture and a lower aperture, the upper and lower apertures aligned axially and generally paralleled to longitudinal axis of the suspension unit and being adapted to receive the suspension unit therein. The support member further includes a double isolation means disposed in the upper and lower apertures for allowing a limited amount of movement of the wheel support member relative to the suspension unit in a direction generally parallel to longitudinal axis of the suspension unit generally as described above.

DETAILED DESCRIPTION OF THE PREFERRED EMBODIMENT

Figure 4:
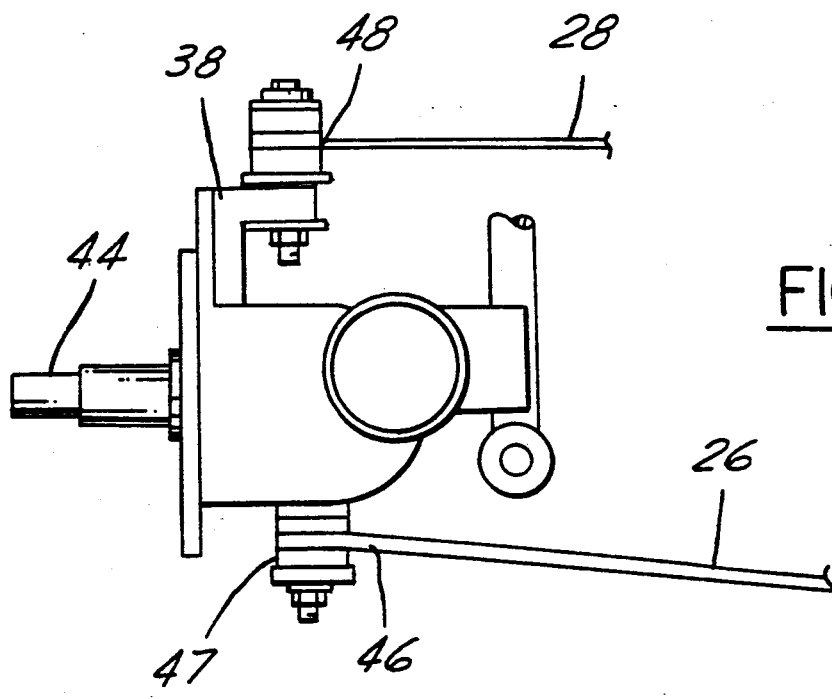
FIG. 4 is a top plan view of the suspension system of FIG. 3.
Figure 2:
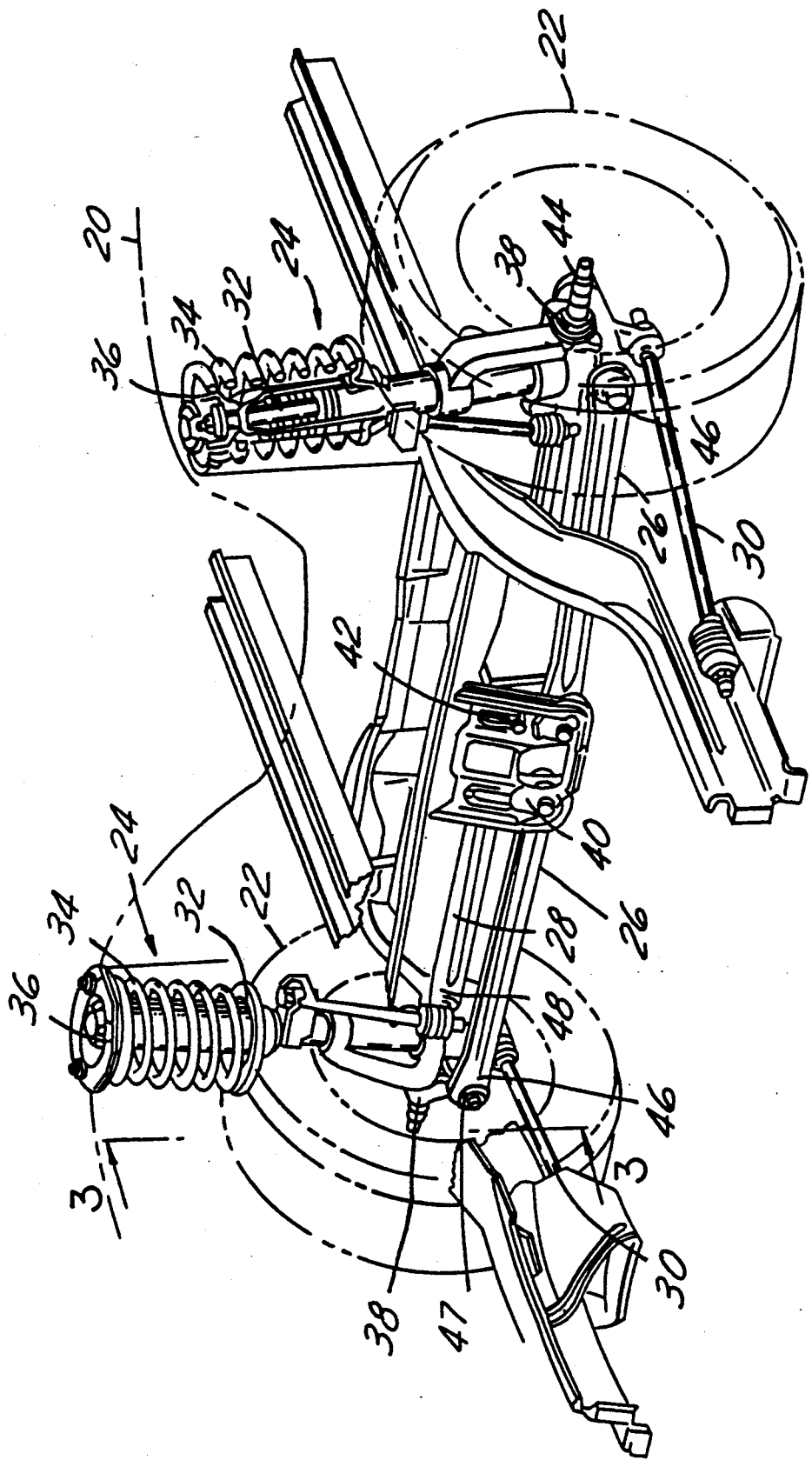
FIG. 2 is a perspective view of a rear independent suspension system structured in accord with the principles of the present invention.
Figure 3:
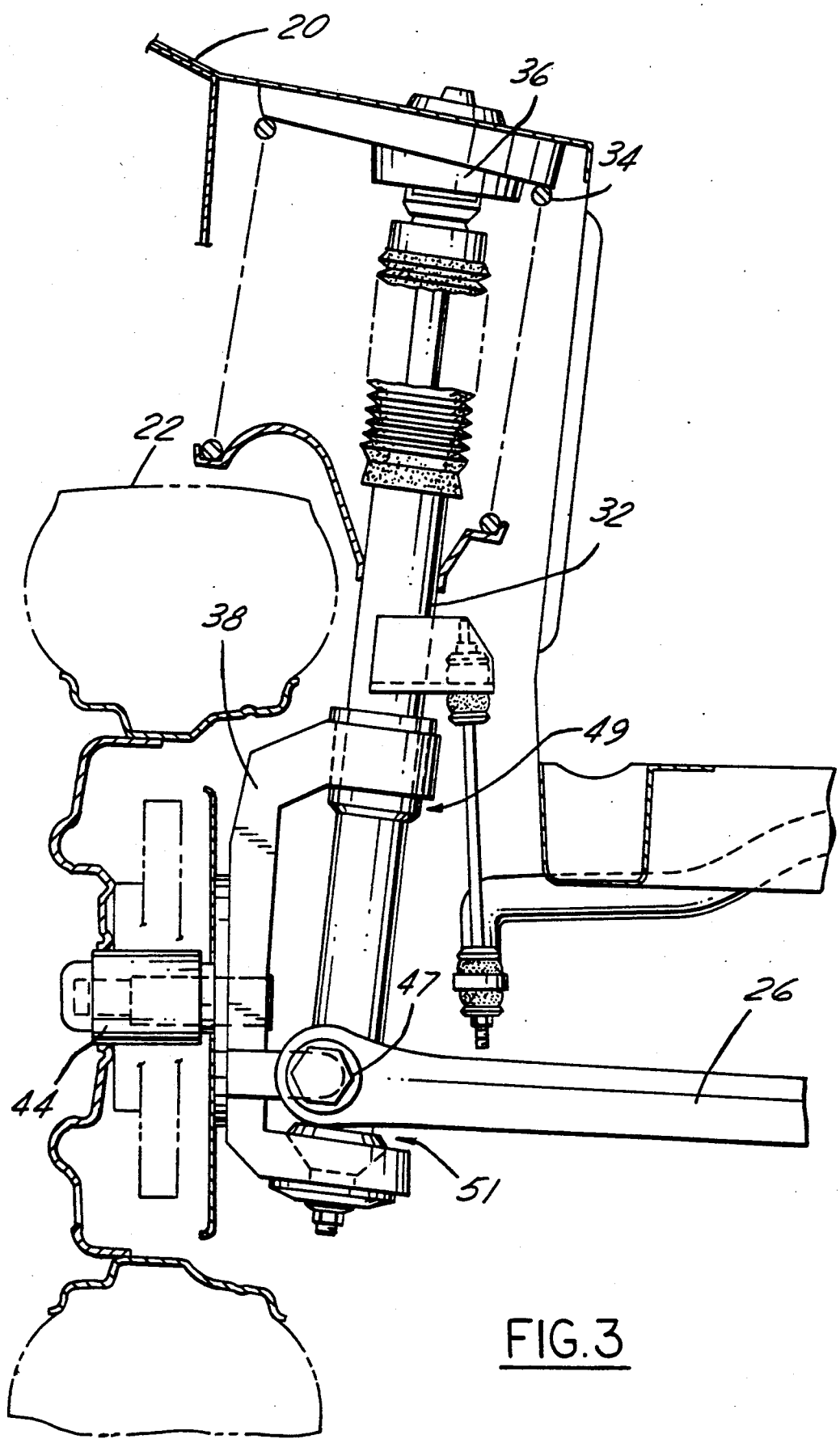
FIG. 3 is a perspective view of one-half of the suspension system of FIG. 2 taken along line 3—3.

Referring now to the drawings, FIGS. 2-4 show a motor vehicle chassis 20 (or a unitized body and chassis) supported on left and right roadwheels 22 by a wheel suspension 24. The suspension 24 is a MacPherson strut independent rear suspension including a pair of front transverse control arms 26, a pair of rear transverse control arms 28, a pair of tension struts 30 and a pair of telescopic MacPherson strut assemblies 32. Each of the telescoping strut assemblies 32 includes a spring 34 and a resilient upper mounted 36 connecting the shock absorber strut assembly to the vehicle chassis 20. Furthermore, as shown more clearly in FIG. 3, and as will be described in detail below, each wheel support member 38 is resiliently connected to a respective telescopic shock absorbing strut 32 at two locations by a double isolation means according to the present invention. The present invention is being described with reference to the shown MacPherson strut independent rear suspension 24, but it will become apparent to those skilled in the art that the present invention may be used in any type of a suspension utilizing a shock absorber strut suspension unit. The present invention is not meant to be limited solely to the independent rear suspension as shown in FIGS. 2 through 4, and it should be apparent that the present invention may be used in a front suspension of a vehicle as well.

In the illustrated quadralink rear suspension, elastomeric bushings 40, 42 pivotally connect the inner ends of the control arms 26, 28 respectively to the chassis 20 of the vehicle. As shown in FIG. 4, an elastomeric bushing 47 pivotally connects the outboard ends 46, 48 of the front and rear control arms 26, 28, respectively, to the wheel support member 38 in a known manner. Each wheel support member 38 is positioned between the outer ends 46, 48 of the front and rear control arms 26, 28, respectively. A wheel spindle 44 rotatably supports each of the wheels 22 and projects through an aperture (50, FIG. 5) in the wheel support member 38. In the preferred embodiment of the invention, the wheel spindle 44 is press fit into aperture 50, although many other known ways of securing the spindle to the wheel support member may be utilized as well.

Figure 1:
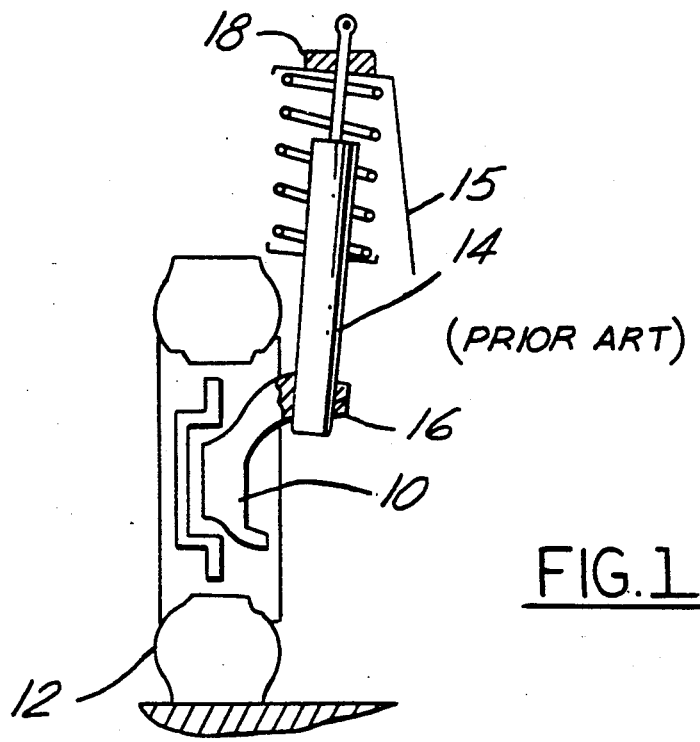
FIG. 1 is a perspective view of a prior art MacPherson strut type suspension assembly.
Figure 6:
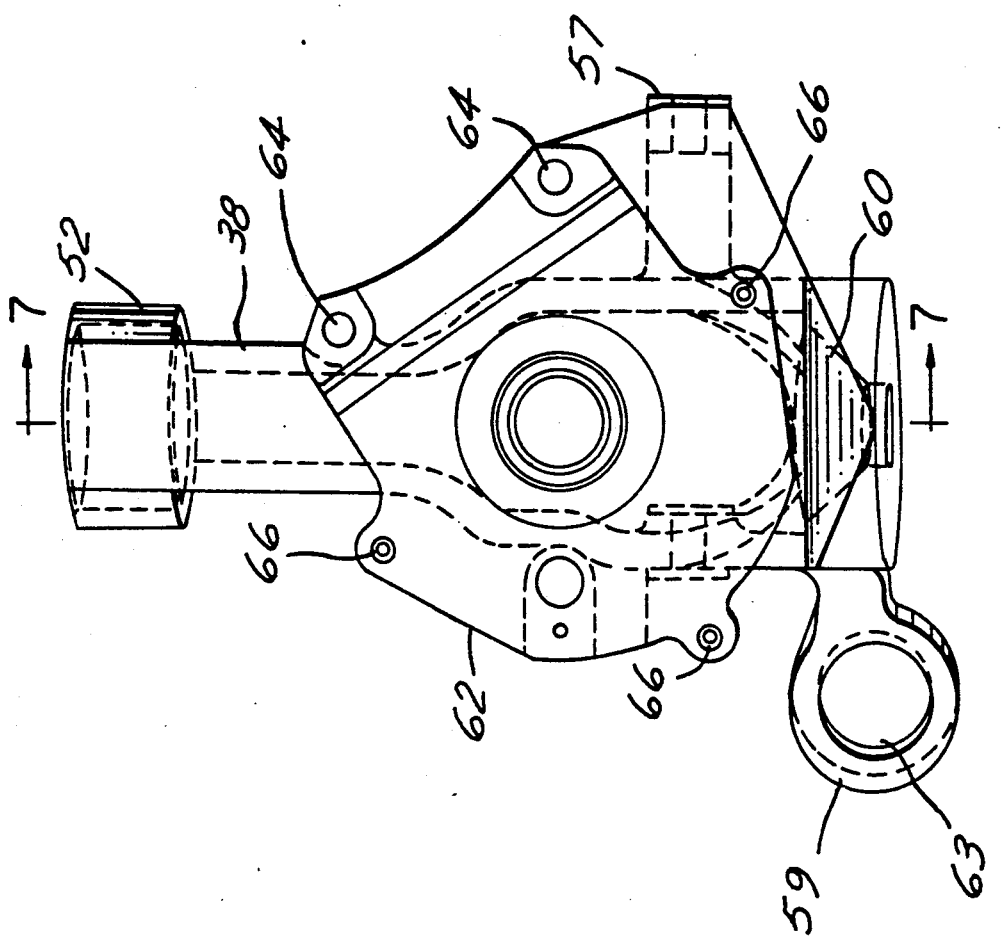
FIG. 6 is a side elevational view of the wheel support member assembly of FIG. 5.
Figure 5:
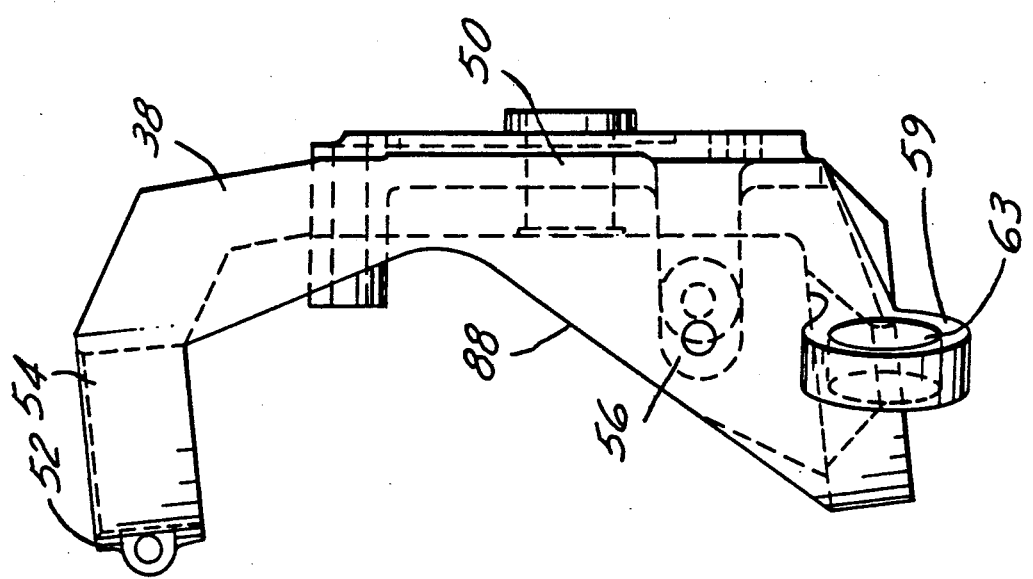
FIG. 5 is a perspective, front elevational view of a wheel support member assembly of FIG. 3 structured in accord with the principles of the present invention.
Figure 7:
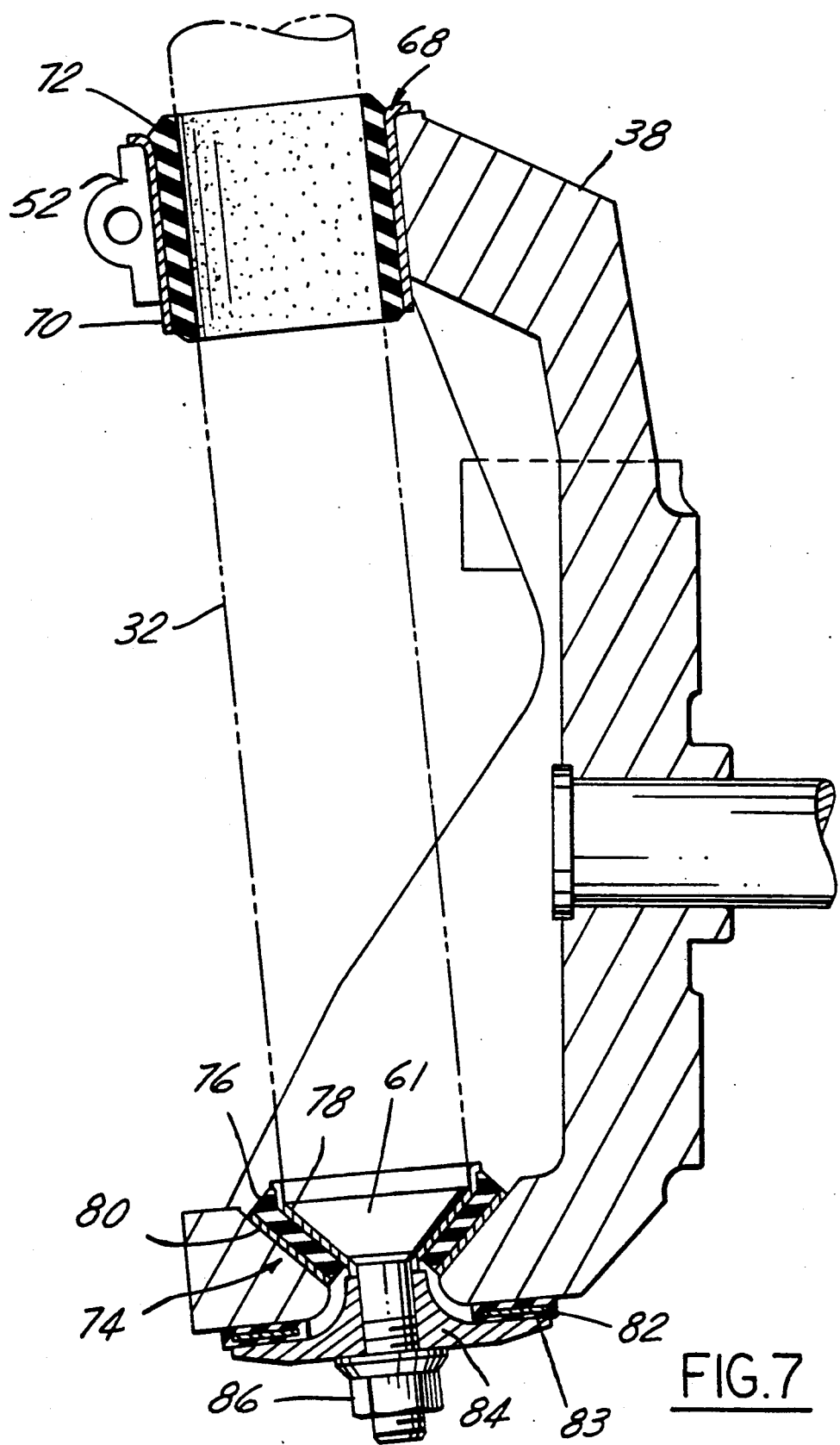
FIG. 7 is a cross-sectional view of the wheel support member assembly of FIG. 5 taken along line 7—7.

Referring now to FIGS. 5-7, the wheel support member 38 of the present invention includes a collar 52 disposed at the upper end thereof, the collar 52 including an aperture 54 which receives the telescoping shock absorbing strut unit 32 therethrough. The wheel support member 38 further includes a pair of mounting arms 56, 57 formed integrally therewith and having receiving apertures therein for connecting the outboard ends 46, 48 of front and rear control arms, 26, 28, respectively, thereto. Similarly, the wheel support member includes support arm 59 fabricated integrally therewith. Support arm 59 includes an aperture 63 for receiving the tension strut (30, FIG. 1) therein. The wheel support member 38 also includes a lower aperture 60 which receives the lowermost end 61 of the strut assembly therein as will be described in greater detail below.

As shown more clearly in FIG. 6, the wheel support member 38 of the present invention further includes an integral mounting plate 62 having a pair of apertures 64 which receive the threaded fasteners for mounting the brake calipers thereon. The mounting plate 62 further includes a plurality of aperture 66 for receiving threaded fasteners for mounting a dust shield thereon. In the preferred embodiment, the wheel support member of the present invention is formed in a casting operation from a ferrous alloy material. However, it is contemplated that other types of materials, such as aluminum or other ferrous alloys may be utilized in the present invention. Furthermore, the present invention is not to be limited solely to a wheel support member which has been cast, it being understood that other manufacturing processes, such as a stamping operation, may be employed to manufacture the present invention.

As shown in FIGS. 5 and 6, the wheel support member 38 of the present invention may further include a supporting rib member 88. Rib member 88 strengthens the wheel support member 38 so that under compression and rebound loading, the wheel support member 38 does not crack or undergo other failure. The rib member 88 nearly completely surrounds the telescopic shock absorbing unit 32 near the lowermost end of the unit since the bottom of the wheel support member 38 experiences more stress than the upper end of the wheel support member.

Referring now to FIG. 7, the wheel support member 38 of the present invention includes an upper isolation bushing 68 disposed in the upper aperture 54 of collar 52. The upper isolation bushing 68 includes a rigid cylindrical member 70 interposed between an elastomeric material 72 and the inner wall of aperture 54. The elastomeric material 72, such as a natural rubber or other synthetic material, circumferentially surrounds the shock absorber strut assembly 32 and resiliently holds the shock absorbing assembly in place. The upper isolation bushing 68 allows the wheel support member 38 a limited amount of vertical movement with respect to the telescopic shock absorber strut assembly 32 in a vertical direction generally parallel to the longitudinal axis of the strut unit 32 when the vehicle wheel experiences a vertical up and down movement such as during a jounce or rebound movement. As the roadwheel encounters a jounce or rebound occurrence on the surface upon which it is traveling, the elastomeric material 72 isolates the vibration experienced by the wheel from the telescopic shock absorbing unit 32. In this manner, the vibration is not passed through the telescopic shock absorbing unit 32 to the vehicle body as in prior art designs.

The wheel support member 38 of the present invention further includes a lower isolation bushing 74 disposed in lower aperture 60. The lower isolation bushing 74 comprises a frustoconical elastomeric bushing 76 interposed between a pair of frustoconical rigid plates 78, 80. The lowermost end of the telescopic shock absorber unit 61 seats against the interior rigid plate 78 and is secured to the lower bushing 74 by means of a threaded rod fastener 86 and a retainer 84. A washer 82 comprising a rigid metal plate 83 disposed within an elastomeric material is interposed between the retainer 84 and the outer rigid plate 80 of the lower isolation bushing 60. The lower isolation bushing 60 further allows a limited amount of movement of the wheel support member 38 with respect to the telescopic strut assembly in a vertical direction generally parallel to the longitudinal axis of the strut assembly. Furthermore, the elastomeric material 76 provides a limited amount of damping when the vehicle wheel encounters a jounce or rebounding counter. The inner plate 78 of the elastomeric bushing 76 contacts retainer 84 to isolate the lowermost end of the telescopic shock absorbing unit 32 from the road vibrations encountered by the wheel support member 38. In this respect, the upper isolation bushing 68 and the lower isolation bushing 74 act as a double isolation means for resiliently mounting the telescopic shock absorbing unit 32 and for preventing the road vibrations from passing through the wheel support member to the shock absorbing unit to the vehicle body. Furthermore, the resilient elastomeric bushings comprise means for rotating the wheel support member 38 relative to the transverse control arms about a substantially vertical axis generally parallel to the longitudinal axis of the strut assembly during compression and rebound movement of the wheel support. In this manner, the toe angle of the wheel support is controlled also.

In this fashion, the wheel support member of the suspension as described above provides a double isolation means between the wheel support member and the telescopic shock absorbing strut assembly. Various other variations and modifications of the present invention are possible without departing from its spirit and scope as defined by the appended claims.

What is claimed is:

1. An independent suspension for a vehicle, comprising:
   a chassis;
   an upwardly extending telescopic suspension unit;
   means connecting the upper end of said suspension unit to said chassis; and
   a wheel support member for rotatably mounting a road wheel, said wheel support member including double isolation means for resiliently mounting the lower end of said suspension unit to said wheel support member and for rotating said wheel support member relative to said suspension unit about a substantially vertical axis during compression and rebound movement of said wheel support member.

2. An independent suspension according to claim 1, wherein said double isolation means of said wheel support member comprises an upper aperture and a lower aperture, said upper and lower apertures aligned axially and generally parallel to the longitudinal axis of said suspension unit and being adapted to receive said suspension unit therein.

3. An independent suspension as defined in claim 2, wherein said double isolation means further comprises an upper isolation bushing circumferentially surrounding said suspension unit and disposed in said upper aperture, said upper isolation bushing being operative to allow said wheel support member a limited amount of movement relative to said suspension unit in a direction generally parallel to the longitudinal axis of said suspension unit.

4. An independent suspension as defined in claim 3, wherein said double isolation means further comprises a lower isolation bushing circumferentially disposed around said suspension unit and resiliently mounting the lowermost end of said suspension unit to said wheel support member, said lower isolation bushing being operative to allow said wheel support member a limited amount of movement relative to said suspension unit in a direction generally parallel to the longitudinal axis of said suspension unit.

5. An independent suspension according to claim 3, wherein said upper isolation bushing includes an elastomeric member disposed between said suspension unit and said wheel support member in said upper aperture.

6. An independent suspension according to claim 4, wherein said lower isolation bushing includes a frustoconical elastomeric member interposed between a pair of frustoconical rigid members disposed in said lower aperture.

7. An independent suspension as defined in claim 1, wherein said double isolation means is operative to allow pivotal movement of said wheel support member about a generally vertical axis generally parallel to the longitudinal axis of said suspension unit.

8. An independent suspension as defined in claim 1, further including a rigid support member extending substantially along the length of said wheel support member in a direction generally Parallel to the vertical axis of said suspension unit.

9. An independent suspension as defined in claim 1, wherein said suspension unit is a strut.

10. An independent suspension for a vehicle comprising:
    a chassis;
    an upwardly extending telescopic suspension unit;
    means connecting the upper end of said suspension unit to said chassis; and
    a wheel support member for rotatably mounting a road wheel, said wheel support member including:
       an upper aperture and a lower aperture, said upper and lower apertures being aligned axially and generally parallel to the longitudinal axis of said suspension unit and being adapted to receive said suspension unit therein; and
       double isolation means disposed in said upper and lower apertures for allowing a limited amount of movement of said wheel support member relative to said suspension unit in a direction generally parallel to the longitudinal axis of said suspension unit, said double isolation means comprising an upper isolation bushing circumferentially surrounding said suspension unit and disposed in said upper aperture and a lower isolation bushing circumferentially disposed around said suspension unit and resiliently mounting the lowermost end of said suspension unit to said wheel support member, said lower isolation bushing including a frustoconical elastomeric member interposed between a pair of frustoconical rigid members disposed in said lower aperture.

11. An independent suspension according to claim 10, wherein said upper isolation bushing includes an elastomeric member disposed between said suspension unit and said wheel support member in said upper aperture.

12. An independent suspension as defined in claim 10, wherein said double isolation means is operative to allow pivotal movement of said wheel support member about a generally vertical axis generally parallel to the longitudinal axis of said suspension unit.

13. An independent suspension for a vehicle comprising:
- a chassis;
- an upwardly extending telescopic suspension strut;
- means pivotably connecting the upper end of said suspension strut to said chassis; and
- a wheel support member for rotatably mounting a road wheel, said wheel support member including:
  - an upper aperture and a lower aperture, said upper and lower apertures aligned axially and generally parallel to the longitudinal axis of said suspension strut and being adapted to receive said suspension strut therein;
  - an upper isolation bushing circumferentially surrounding said suspension strut and disposed in said upper aperture, said upper bushing including an elastomeric member disposed between said suspension strut and said wheel support member in said upper aperture;
  - a lower isolation bushing circumferentially disposed around said suspension strut and resiliently mounting the lowermost end of said suspension strut to said wheel support member, said lower isolation bushing includes a frustoconical elastomeric member interposed between a pair of frustoconical rigid members disposed in said lower aperture;
  - whereby said upper isolation bushing and said lower isolation bushing are operative to allow movement of said wheel support member relative to said suspension strut in a direction generally parallel to the longitudinal axis of said strut as well as pivotal movement of said wheel support member about a generally vertical axis generally parallel to the longitudinal axis of said suspension strut.

14. A wheel support member for rotatably mounting a road wheel of a vehicle for use in an independent suspension of the type including a telescoping suspension unit attached at its upper end to the chassis of the vehicle, said wheel support member comprising:
- an upper aperture and a lower aperture, said upper and lower apertures aligned axially and generally parallel to the longitudinal axis of said suspension unit and being adapted to receive said suspension unit therein; and
- double isolation means disposed in said upper and lower apertures for allowing a limited amount of movement of said wheel support member relative to said suspension unit in a direction generally parallel to the longitudinal axis of said suspension unit, said double isolation means comprising an upper isolation bushing circumferentially surrounding said suspension unit and disposed in said upper aperture and a lower isolation bushing circumferentially disposed around said suspension unit and resiliently mounting the lowermost end of said suspension unit to said wheel support member, said lower isolation bushing including a frustoconical elastomeric member interposed between a pair of frustoconical rigid members disposed in said lower aperture.

15. An independent suspension according to claim 14, wherein said upper isolation bushing includes an elastomeric member disposed between said suspension unit and said wheel support member in said upper aperture.

16. An independent suspension as defined in claim 14, wherein said double isolation means is operative to allow pivotal movement of said wheel support member about a generally vertical axis generally parallel to the longitudinal axis of said suspension unit.

17. A wheel support member for rotatably mounting a road wheel of a vehicle for use in an independent suspension of the type including a telescoping suspension unit attached at its upper end to the chassis of the vehicle, said wheel support member comprising:
- an upper aperture and a lower aperture, said upper and lower apertures aligned axially and generally parallel to the longitudinal axis of said suspension unit and being adapted to receive said suspension unit therein;
- an upper isolation bushing circumferentially surrounding said suspension unit and disposed in said upper aperture, said upper bushing including an elastomeric member disposed between said suspension unit and said wheel support member in said upper aperture;
- a lower isolation bushing circumferentially disposed around said suspension unit and resiliently mounting the lowermost end of said suspension unit to said wheel support member, said lower isolation bushing includes a frustoconical elastomeric member interposed between a pair of frustoconical rigid members disposed in said lower aperture;
- whereby said upper isolation bushing and said lower isolation bushing are operative to allow movement of said wheel support member relative to said suspension unit in a direction generally parallel to the longitudinal axis of said unit as well as pivotal movement of said wheel support member about a generally vertical axis generally parallel to the longitudinal axis of said suspension unit.

* * * * *